United States Patent [19]

Okura

[11] Patent Number: 4,542,562
[45] Date of Patent: Sep. 24, 1985

[54] CABLE CLAMP

[76] Inventor: Masahiko Okura, 11-7, 4-Chome, Shiroganedai, Minato-ku, Tokyo, Japan

[21] Appl. No.: 698,675

[22] Filed: Feb. 6, 1985

[51] Int. Cl.⁴ ............................................. F16G 11/04
[52] U.S. Cl. .............................. 24/136 R; 24/115 M; 403/109; 403/112
[58] Field of Search ............ 24/136 R, 136 L, 115 M; 403/16, 109, 112

[56] References Cited

U.S. PATENT DOCUMENTS

| 1,393,107 | 10/1921 | Fuller | 24/136 R |
| 1,545,889 | 7/1925 | Everson | 24/136 R |
| 1,653,840 | 12/1927 | Byl | 24/115 M |
| 1,656,226 | 1/1928 | Palm et al. | 24/136 R |
| 1,759,591 | 5/1930 | Pleister et al. | 24/115 M |
| 2,068,368 | 1/1937 | Bouvier et al. | 24/136 R |
| 2,529,327 | 11/1950 | Carlson | 24/136 R |
| 2,781,212 | 2/1957 | Jugle | 24/115 M |
| 4,040,754 | 8/1977 | Burroughs | 24/136 R |

FOREIGN PATENT DOCUMENTS 147265  4/1953  Australia ........................... 24/136 R Primary Examiner—Victor N. Sakran
Attorney, Agent, or Firm—Moonray Kojima

[57] ABSTRACT

Disclosed herein is a cable clamp having a quite simple and easily operable construction, wherein a wedge-like member and a sleeve-like member are telescopically assembled to clamp a cable therebetween, said two members being adapted to be in an inseparable (or linked) condition at all times.

2 Claims, 6 Drawing Figures

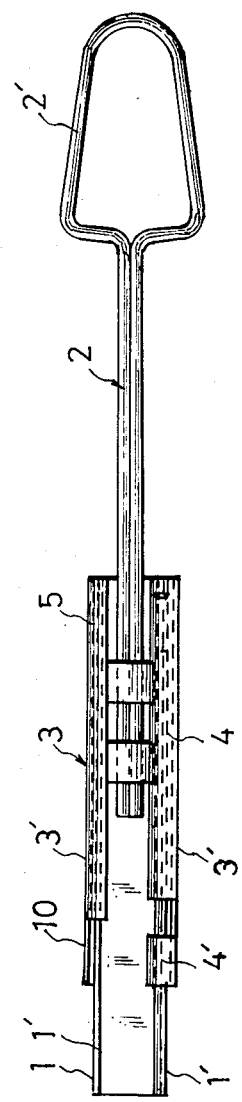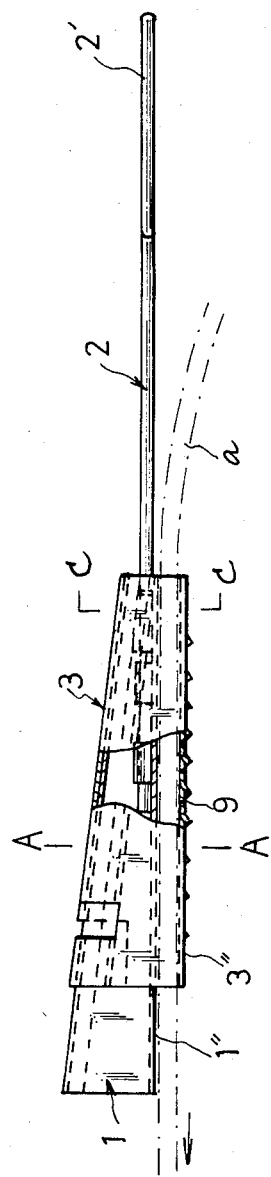

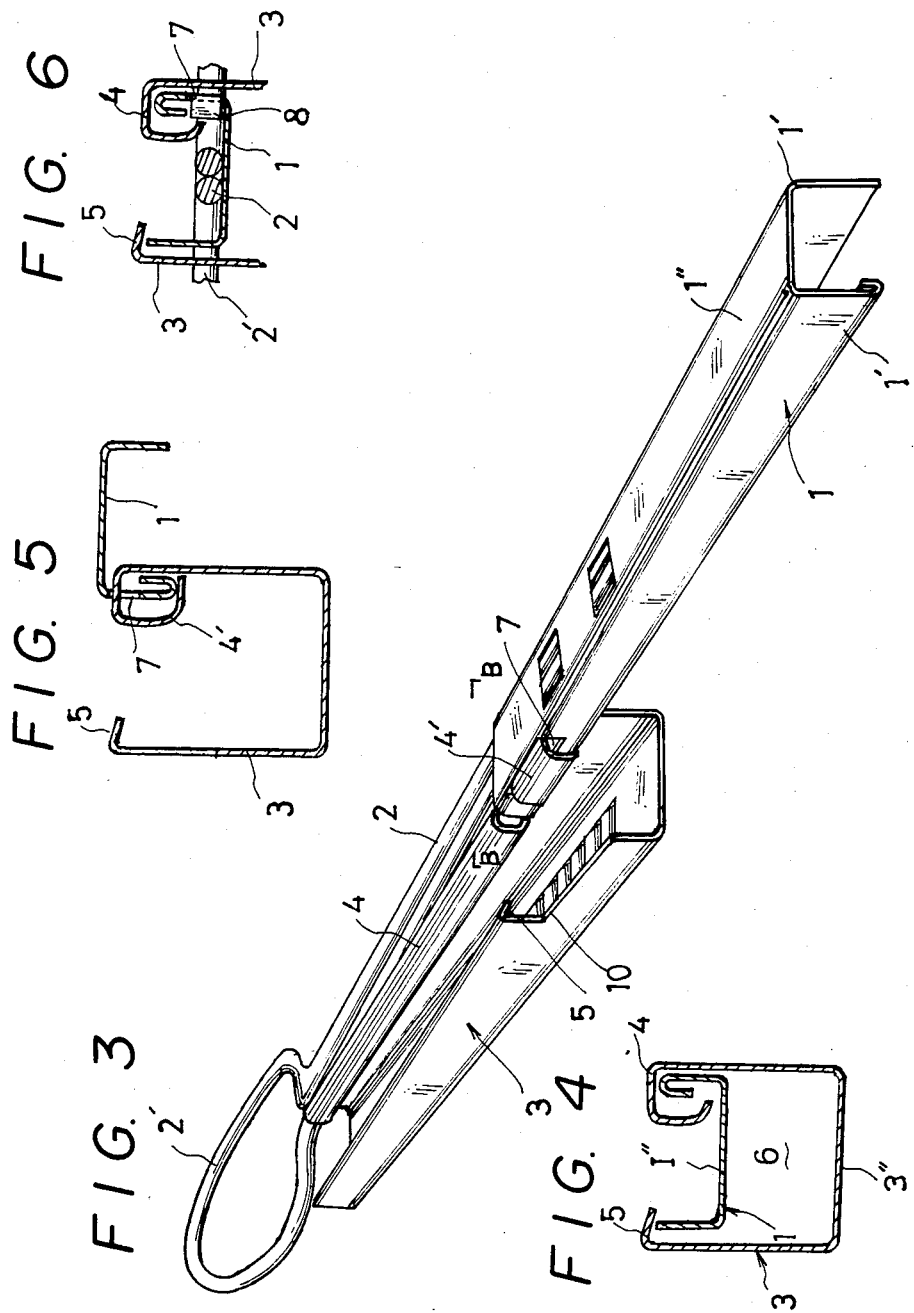

CABLE CLAMP

BACKGROUND OF THE INVENTION

This invention relates to an improvement of the clamps for use in clamping cables at desired points.

Heretofore, various cable clamping means have been disclosed but no ideal one has appeared either because of too severely clamping construction which causes damage of the cable coat, exposure of naked wire, trouble in clamping operation or rather loosely clamping construction causing disengagement of the clamped cable, short-circuit with time.

SUMMARY OF THE INVENTION

The one object of the invention is to provide a cable clamp of simple and easy operable construction being capable of restraining a cable by a wedge action. For this purpose, this invention comprises three members, i.e. a wedge-like member of upper opened channel bar type having side plates formed respectively into a wedge-like plate becoming narrower starting at the rear end thereof in towards the front end of the same. One of the side plates of the sleeve-like member has a deeply inturned longitudinal upper edge while the other having internally slightly bended one. In the cable clamping state, the wedge- and sleeve-like members are assembled in such a fashion that the former may be held in the latter from below in the use of said upper edges of the latter. Thus, cable is to be clamped between the bottom plates of said two members through a wedge action.

The another object of the invention is to provide a cable clamp actuated by a wedge action as mentioned above, wherein the sleeve-like member and the wedge-like member are adapted to be in an inseparable (or linked) condition at any time. For this purpose, three conditions will be shown in detail hereinafter in relation of the accompanying drawing.

BRIEF DESCRIPTION OF THE DRAWING

FIG. 1 is a plan view of a preferred embodiment of the invention showing a clamping state;

FIG. 2 is an, fragmentary sectioned, elevation of the same;

FIG. 3 is an enlarged perspective view, with the wedge-like member in a turned down position;

FIG. 4 is an enlarged sectional (but end face only) view taken along line A—A of FIG. 2;

FIG. 5 is an enlarged sectional (but end face only) view taken along line B—B of the FIG. 3;

FIG. 6 is an enlarged sectional view taken along line C—C of FIG. 2.

DESCRIPTION OF THE PREFERRED EMBODIMENT

In the Figures, 1 is an, substantially, upper opened channel bar type wedge-like member, both side plates 1', 1' of which are formed respectively into a wedge-like plate becoming narrower starting at the rear end thereof in towards the fore end of the same. 2 is a suspending ring member provided with a suspending ring 2' at the fore end portion thereof, the rear end portion of which is attached fixedly on the bottom plate 1" of the member 1 by means of inserting the rear end portion into an aparture formed between the bottom plate 1" and cut-and-raise pieces of the plate 1". 3 is an, substantially, upper opened channel bar type sleeve-like member, both side plates 3', 3' of which are formed respectively into a wedge-like plate after the fashion of the plates 1', 1'. The longitudinal upper edge of the one of the side plates 3', 3' is formed into a deeply inturned edge 4 while the same of the other being formed into a slightly bended one 5. When in use, the member 1 may, as well known in FIGS. 1, 2 and 4, assembled with member 3 in such a manner as held in the latter from below in the use of two edge 4, 5 in longitudinally relatively movable relation for clamping a cable a between the bottom plates 1" and 3", i.e. in a void pace 6 in FIG. 4. 7 is an opening (or window) formed in the fore end portion of the member 1, into which a sectioned rear end part 4' of the upper edge 4 is adapted to engage in a loose fit. This engagement of the members 1 and 3 permits these members to be linked inseparably each other when those members are relatively turned round the engaging point. 8 is a stopper piece projected internally from the fore end portion of the wedge-like member, which, in this instance, is shown as a cut-and-raise piece of the fore end portion of the opening 7 (see FIG. 6). The stopper piece 8 is used for stopping separation of the member 3 from the member 1 even when the former moves forward in any fashion to the latter by means of running against the fore end face of the edge 4'. For this purpose and for ensuring inseparableness of the member 3 in said turning time thereof, the sectioned edge 4' is inturned more deeply than the edge 4 as shown in FIG. 5. 9 is an antiskid portion formed by partial cut-and-raise means of the bottom plates 3". 10 is a cut-out portion formed at the rear end of the edge 5 for convenience in the cable clamping operation as mentioned below.

While in the present invention most important feature is that the wedge-like member and sleeve-like member are adapted to be in an inseparable state at any event, for this purpose a structural condition will be added further, which is that the conture size of the rear end face of the wedge-like member is adopted larger than that of the fore end face of the sleeve-like member. This condition causes the member 3 not to separate from the member 1 when the former moves rearward in the state wherein the two members 1, 3 are assembled for clamping cable. It will be obvious that the addition of the condition makes the member 3 not to separate from member 1 in this event even when it moves rearward at any fashion.

In operation, the member 1 will be turned to the member 3 as shown in FIG. 3 to apply the cable onto the member 3 and then the member 1 is returned onto the member 3 to sandwich the cable in between these members. Thus the cable may be clamped by moving the member 3 rearward, i.e. in virtue of a wedge action.

With the clamp of the present invention, since restraining and anchoring of the cable may be effected in virtue of a wedge action induced by the longitudinal rearward move of the sleeve-like member and yet the anchored cable ordinarily has a tendency to be pulled in the direction shown by the arrow in FIG. 2 in this event, the restraining force of the cable becomes additionally larger resulting in realization of more tightened clamping state. The another effect of the invention consists in that the wedge- and sleeve-like members are adapted to be in linked (or inseparable) condition at any time. It will be obvious that such means may minimize such inconvenience as to drop the sleeve-like or wedge-like member from worker's hand in course of the clamping work which in turn will permit the working efficiency to increase by that.

While in said explanation of the invention two members 1, 3 are respectively shown as a thing of an upper opened channel bar type, it will be naturally thought that those members may be respectively of a down opened channel bar type, and in such case the cable would be clamped between upper plates of said members.

What is claimed is:

1. A cable clamp comprising a wedge-like member 1 of upper opened channel bar type formed with a stopper piece 8 at the inside of the fore end portion thereof, which side plates are respectively made into a wedge-like plate becoming narrower towards the fore end thereof; a suspending ring member 2 attached fixedly on the bottom plate of said member 1 at its base portion to project forwardly from the fore end of the member 1; a sleeve like member 3 of upper opened channel bar type, which side plates are respectively made into a wedge-like plate after the fashion of those of said member 1, one of said side plates providing with a deeply inturned upper edge 4, while the other providing with an internally slightly bended upper edge 5 so that the member 1 may be held in the member 3 from below in a longitudinally movable and vertically spaced relation when in use; means permitting a loosely-fit-engagement of a sectioned rear end part 4' of said edge 4 and an opening 7 formed in the fore end portion of the member 1 for accomplishing an inseparable relative turning of said members 1, 3 round said engagement point; a means causing said stopper piece to run against said edge 4' even when the member 3 moves forward in any fashion relative to the member 1; and making the conture size of the rear end face of the wedge-like member larger than that of the fore end face of the sleeve-like member.

2. A cable clamp according to claim 1, wherein said sleeve member is formed with an antiskid face portion 9 on the bottom plate thereof.

* * * * *